May 21, 1940.　　　　T. G. MYERS　　　　2,201,699
MAGNETIC STRUCTURE FOR DYNAMO-ELECTRIC MACHINES
Filed Dec. 21, 1936
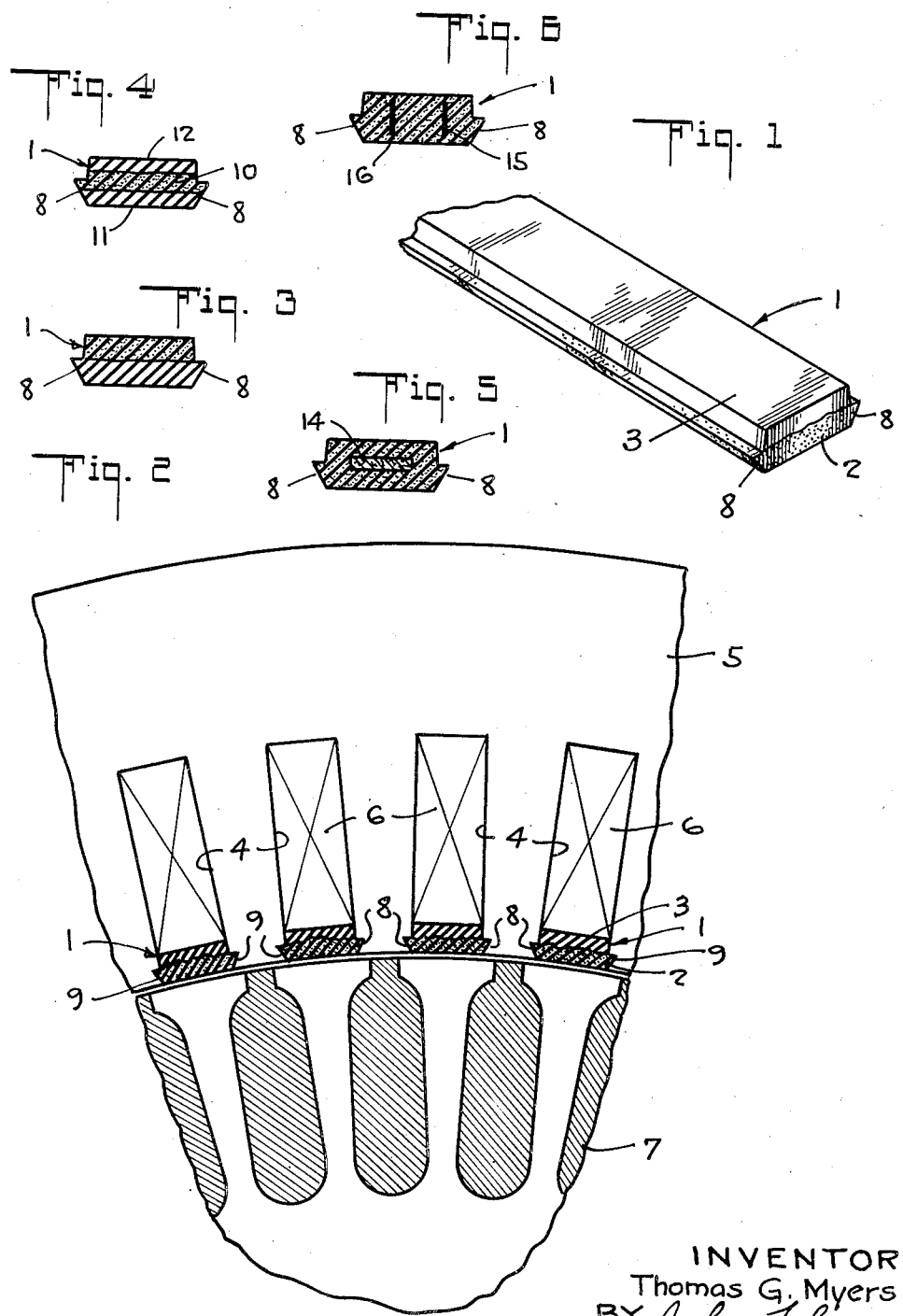
INVENTOR
Thomas G. Myers
BY John Flam
ATTORNEY Patented May 21, 1940

2,201,699

UNITED STATES PATENT OFFICE 2,201,699

MAGNETIC STRUCTURE FOR DYNAMO-ELECTRIC MACHINES

Thomas G. Myers, Los Angeles, Calif., assignor to U. S. Electrical Motors, Inc., Los Angeles, Calif., a corporation of California Application December 21, 1936, Serial No. 116,929

2 Claims. (Cl. 171—252)

This invention relates to slot closing members, or top sticks, for use in connection with the magnetic structures of dynamo-electric machines, such as the stators of induction motors.

This application is a continuation in part of a co-pending application of Thomas G. Myers, for "Magnetic structure for dynamo-electric machines," Serial No. 90,556, filed July 14, 1936.

The stator structures for such motors are usually made up of a series of slotted soft steel or iron punchings, which are held compactly together by appropriate fastening means, such as rivets. It is well understood that such laminations in a direction axial of the motor, serve to reduce eddy current losses which may become excessive unless this mode of construction is used.

The windings for the stator are accommodated in the slots. In order to improve the efficiency or performance of the motor, it has been proposed to provide slots that are closed or nearly closed. Under such circumstances, it is necessary to insert the windings or coils a few wires at a time through the slots. Such a procedure is expensive; and could not be effectively utilized for any except motors that operate under comparatively low electromotive forces, such as 400 volts. For higher electromotive forces, such as for 2200 volt operation, the insulation must be heavy and the coils form wound, precluding the possibility of this endwise insertion.

In order to obtain the advantages of closed slots, it has been proposed to use laminations having open slots into which the winding can be easily placed, and then to close the slots by a magnetic stick. Such a construction however has been found disadvantageous, for the eddy current losses in the sticks reduce the efficiency of the motor, and in fact may cause excessive heating of the sticks.

It is one of the objects of this invention to make it possible to utilize any form of winding in the stator slots, without the necessity of using loose wound coils, and yet obtain the advantages of closed slots without excessive eddy current losses.

It is another object of the invention to provide magnetic top sticks for closing the slots, made in such fashion that the eddy-current loss is reduced to an immaterial amount.

It is still another object of the invention to provide a magnetic top stick of increased mechanical strength.

In order to attain these objects, the top sticks are formed with different parts of a cross section thereof composed of different materials, one part being a compound of magnetic material and a binder, which may be mechanically weak, the other part being of some non-conducting material which is mechanically strong, thus serving to preserve the stick from breakage. For instance, one part of the stick may be made up of finely divided magnetic material, such as iron or soft steel held together by a non-metallic binder, such as a phenolic condensation product, the other part of the stick being formed by the binder alone. Thus the binder not only serves to insulate the magnetic particles or groups of particles from each other, but also to hold the stick in shape and give it mechanical strength and rigidity, so that it may be forced into place in the stator without cracking. When a phenolic condensation product is used, the combined mass is subjected to heat and pressure in a mold, in the manner used for molding Bakelite.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is a fragmentary pictorial view of a top stick embodying the invention;

Fig. 2 is a fragmentary sectional diagram of a magnetic structure embodying the invention; and Figs. 3, 4, 5 and 6 are cross sectional views of various modified forms of a magnetic structure embodying the invention.

Referring to Figs. 1 and 2, the top stick 1 has a portion 2 composed of a mixture of magnetic material and a binder and a portion 3, in the nature of a reenforcing rib, which may consist of the binder alone without the addition of other material, or it may consist of other suitable material. The portion 2 of the top stick can be made from a composition of from six to ten parts powdered iron, soft steel, or other magnetic material, and about one part of resin or other non-metallic binder. These proportions are by weight. The ingredients in powdered form can be first thoroughly mixed and then placed in a mold to the desired depth; the ingredients for the reenforcing rib may then be added, and the resulting mass formed by heat and pressure to the desired form.

The sticks 1 are shown in Fig. 2 as closing the slots 4 of the stator 5. The stator windings 6 are merely diagrammatically illustrated. The stator structure is shown as cooperating with a rotor structure 7 of the cast squirrel cage type.

The top sticks 1 may be provided with the sloping side wings 8 adapted to enter into the corresponding recesses 9 near the bottom of slots 4; thereby the sticks are locked against radial movement.

The sticks 1 are intended to be inserted or driven into place from the end of stator magnet structure 5. This structure 5 may also be made up of a homogeneous mixture of a non-metallic binder and magnetic powdered material, such as iron or soft steel, in about the same proportions as used for the sticks 1.

In Fig. 3, the top stick 1 is substantially the same as that shown in Figs. 1 and 2, except that the side wings 8 are formed on the reenforcing rib, that is, the binder and the mixture of binder and magnetic material occupy interchanged positions as compared with the first form. In Fig. 4, the mixture of the binder and magnetic material forms the central portion 10 of the top stick, between the reenforcing ribs 11 and 12 of the binder alone. In the form shown in Fig. 5 the magnetic mixture surrounds a strip of fibre, or other suitable material 14, extending lengthwise of the stick for the purpose of reenforcing it. This strip may be provided with perforations or other means to secure it in place in the stick. In Fig. 6, the stick is shown as including parallel strips of cloth 15 and 16, embedded in the magnetic mixture for the purpose of reenforcement. These extend lengthwise of the stick, the porosity of the cloth permitting a firm bond between the strips and the mixture. There are, of course, many other ways in which the reenforcement can be arranged without departing from the spirit of the invention. For example, the portion 10 of Fig. 4 might extend vertically, as viewed in that figure, with the reenforcing ribs 10 on either side of it. On the fibre strip of Fig. 5 might be disposed vertically, or the two cloth strips of Fig. 6 might be changed to a single strip, placed as indicated in Fig. 5.

What is claimed is:

1. A top stick for closing the slot in a magnetic structure for dynamo-electric machines, comprising a member formed of a mixture of divided particles of magnetic material and a non-metallic binder, and a reenforcing member integrally joined to the first mentioned member and made solely from the same material as forms the said binder, said reenforcing member overlying the first mentioned member.

2. A top stick for closing the slot in a magnetic structure for dynamo-electric machines, comprising a unitary member formed partly of a mixture of divided particles of magnetic material and a non-metallic binder, the rest of the stick being formed of the binder alone, the portion formed of the binder alone forming a reenforcing member overlying the other portion.

THOMAS G. MYERS.